(12) United States Patent
Boeck et al.

(10) Patent No.: US 12,434,546 B2
(45) Date of Patent: Oct. 7, 2025

(54) ENERGY STORAGE FLOOR ASSEMBLY FOR AN ELECTRICALLY DRIVABLE MOTOR VEHICLE

(71) Applicant: Bayerische Motoren Werke Aktiengesellschaft, Munich (DE)

(72) Inventors: Alexander Boeck, Munich (DE); Nermin Kecalevic, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 309 days.

(21) Appl. No.: 18/034,274

(22) PCT Filed: Oct. 8, 2021

(86) PCT No.: PCT/EP2021/077807
§ 371 (c)(1),
(2) Date: Apr. 27, 2023

(87) PCT Pub. No.: WO2022/089914
PCT Pub. Date: May 5, 2022

(65) Prior Publication Data
US 2023/0311631 A1 Oct. 5, 2023

(30) Foreign Application Priority Data
Oct. 30, 2020 (DE) ............ 10 2020 128 605.8

(51) Int. Cl.
*B60K 1/04* (2019.01)
*B62D 21/15* (2006.01)
(Continued)

(52) U.S. Cl.
CPC ............ *B60K 1/04* (2013.01); *B62D 21/15* (2013.01); *H01M 50/242* (2021.01);
(Continued)

(58) Field of Classification Search
CPC ............ B60K 1/04; B60K 2001/0438; H01M 50/242; H01M 50/249; H01M 2220/20; B62D 21/15; B60L 50/66
See application file for complete search history.

(56) References Cited

U.S. PATENT DOCUMENTS

| 5,555,950 A | 9/1996 | Harada et al. |
|---|---|---|
| 10,597,081 B2 | 3/2020 | Ayukawa |

(Continued)

FOREIGN PATENT DOCUMENTS

| CN | 111376983 A | 7/2020 |
|---|---|---|
| DE | 10 2013 204 757 A1 | 9/2013 |

(Continued)

OTHER PUBLICATIONS

International Search Report (PCT/ISA/210) issued in PCT Application No. PCT/EP2021/077807 dated Jan. 28, 2022 with English translation (seven (7) pages).

(Continued)

*Primary Examiner* — Edwin A Young
(74) *Attorney, Agent, or Firm* — Crowell & Moring LLP

(57) ABSTRACT

An energy storage floor assembly for a motor vehicle having an electric drive includes an electrical energy storage device accommodated in a storage housing and arranged on the bottom side of a vehicle floor. At least one longitudinal beam is arranged within the storage housing. The front end of the longitudinal beam, viewed in the vehicle direction, is connected at least indirectly to a crossbeam component which is arranged in the region of a front-end structure and to which a front axle carrier is also attached. A load transfer element is installed between a rearward region of the front axle carrier and the front end of the longitudinal beam, which load transfer element has a front support region on the front end thereof and a rear support region on the rear end thereof. In an event of an accident-induced backward movement of (Continued)

Figure 1:
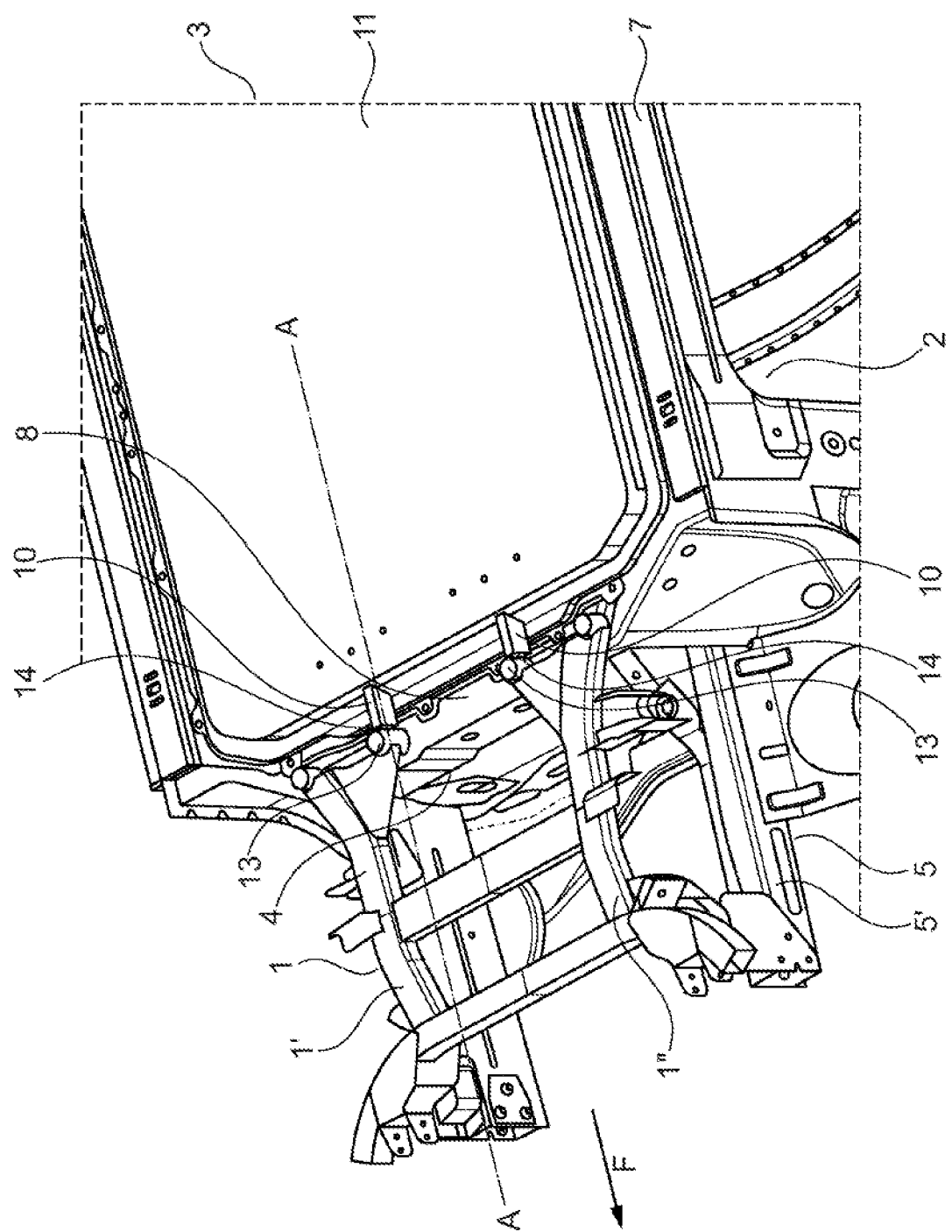

the axle carrier as a result of a collision, the axle carrier can be supported on the front support region of the load transfer element, the rear support region of which can be supported at least indirectly on the longitudinal beam.

4 Claims, 2 Drawing Sheets

(51) Int. Cl.
    *H01M 50/242*     (2021.01)
    *H01M 50/249*     (2021.01)
    *B60L 50/60*     (2019.01)

(52) U.S. Cl.
    CPC ... *H01M 50/249* (2021.01); *B60K 2001/0438* (2013.01); *B60L 50/66* (2019.02); *H01M 2220/20* (2013.01)

(56) References Cited

U.S. PATENT DOCUMENTS

| | | | | |
|---|---|---|---|---|
| 11,155,150 | B2* | 10/2021 | Stephens | B60K 11/02 |
| 11,312,219 | B2* | 4/2022 | Klomberg | B60L 50/66 |
| 2013/0249243 | A1 | 9/2013 | Lee et al. | |
| 2013/0306394 | A1* | 11/2013 | Theodore | B60K 6/40 |
| | | | | 280/798 |
| 2015/0314807 | A1 | 11/2015 | Nusier et al. | |
| 2016/0068195 | A1 | 3/2016 | Hentrich et al. | |
| 2018/0229593 | A1 | 8/2018 | Hitz et al. | |
| 2018/0272852 | A1 | 9/2018 | Ajisaka | |
| 2019/0092395 | A1 | 3/2019 | Makowski et al. | |
| 2019/0322164 | A1 | 10/2019 | Sasaki et al. | |
| 2023/0045568 | A1 | 2/2023 | Danneberg et al. | |

FOREIGN PATENT DOCUMENTS

| | | |
|---|---|---|
| DE | 10 2013 006 702 A1 | 10/2014 |
| DE | 20 2015 102 177 U1 | 6/2015 |
| DE | 10 2017 102 699 A1 | 8/2018 |
| DE | 10 2018 105 371 A1 | 9/2018 |
| DE | 10 2018 123 357 A1 | 3/2019 |
| DE | 10 2018 132 257 A1 | 6/2020 |
| DE | 10 2020 102 480 A1 | 8/2021 |
| EP | 2 468 609 A2 | 6/2012 |
| EP | 3 590 792 A1 | 1/2020 |
| JP | 7-117725 A | 5/1995 |
| KR | 10-2019-0086171 A | 7/2019 |

OTHER PUBLICATIONS

German-language Written Opinion (PCT/ISA/237) issued in PCT Application No. PCT/EP2021/077807 dated Jan. 28, 2022 (five (5) pages).

German-language Search Report issued in German Application No. 10 2020 128 605.8 dated Jun. 10, 2021 with partial English translation (11 pages).

Korean-language Office Action issued in Korean Application No. 10-2023-7014130 dated Oct. 21, 2024 with English translation (8 pages).

* cited by examiner

ENERGY STORAGE FLOOR ASSEMBLY FOR AN ELECTRICALLY DRIVABLE MOTOR VEHICLE

BACKGROUND AND SUMMARY

The invention relates to an energy storage floor assembly for an electrically drivable motor vehicle.

Such an energy storage floor assembly for an electrically drivable motor vehicle is already described in the Applicant's as yet unpublished German patent application DE 10 2020 102 480.0, as a storage housing which is arranged on the underside of a vehicle floor and in which an electrical energy storage device is accommodated, the storage housing containing at least one longitudinal beam which is at least indirectly connected at one end to a beam component of the motor vehicle arranged in the region of a front-end structure. As compared with earlier prior art, such as EP 2 468 609 A2, this serves for providing sufficient stiffness of the body structure in the region of the vehicle floor and a safety passenger cell, without the need to accept a great extra weight of the motor vehicle body and restrictions on the installation space in the interior of the safety passenger cell, which would also additionally impair the ergonomics within the safety passenger cell.

The object of the present invention is therefore that of developing such an energy storage floor assembly in such a way that, in the event of a crash in which a front-axle support is stressed to dissipate deformation energy, the latter is enabled to do so without the high-voltage storage unit or the storage cells being damaged.

This object is achieved according to the invention by an energy storage floor assembly with the features of the independent claim. Advantageous embodiments of the invention are described by the dependent claims.

An energy storage floor assembly for a motor vehicle with an electrical drive, which comprises an electrical energy storage device which is accommodated in a storage housing and is arranged on the underside of a vehicle floor, the storage housing containing at least one longitudinal beam, the front end of which, seen in the direction of the vehicle, is at least indirectly connected to a crossbeam component, which is arranged in the region of a front-end structure and to which a front-axle support is also attached, is characterized in that inserted between a rear region of the front-axle support and the front end of the longitudinal beam is a load transmission element, which has at its front end a front supporting region and at its rear end a rear supporting region, wherein, when there is an accident-induced backward movement of the front-axle support, as a result of a collision, the latter can be supported on the front supporting region of the load transmission element, the rear supporting region of which can be at least indirectly supported on the longitudinal beam.

This has the advantage that the front-axle support is not directly bolted to the energy storage floor assembly, but in the event of its crash-induced displacement to the rear is supported on each longitudinal beam in the storage housing by way of the respective load transmission element, and thus a further crash-energy-dissipating deformation of the front-axle support can commence, for dissipating residual crash energy, which without load transmission elements would under some circumstances have allowed the front-axle support to impact the energy storage floor assembly at a different location than the position of the respective longitudinal beams on account of uncontrolled deformation paths of the front-axle support. Thus, very favorable supporting positions in terms of structural design and from safety aspects of the front-axle support on all of the longitudinal beams in the storage housing are advantageously ensured, and a favorable deformation from crash aspects of the front-axle support for maximum energy dissipation is made possible in the first place, so that the front-axle support can build up a greater load level as a result of the load transmission elements providing support.

It is also particularly advantageous in this connection if the at least one longitudinal beam is fastened on the underside of the vehicle floor. This allows each longitudinal beam to be optimally used for supporting the load transmission elements, in that it optimally forms a force or load path under the safety passenger cell. The at least one longitudinal beam may also be directly connected to a crossbeam component. As a result, forces, for example from the region of the front-end structure of the motor vehicle, can be optimally supported and transmitted rearward in the longitudinal direction of the vehicle.

A further embodiment of the invention provides that a gap, in particular a distance of 5 to 10 millimeters, is provided between a front supporting region of each load transmission element and the front-axle support or a front-axle support fastening, in the longitudinal direction of the vehicle. Such a gap, in the longitudinal direction of the motor vehicle, between the front-axle support and the load transmission element, with longitudinal beams of the high-voltage storage unit lying behind the latter, also advantageously makes separate fitting of the front-axle support and the high-voltage storage unit possible. The load transmission element is directly attached to the high-voltage storage unit and to the rear in the longitudinal direction of the vehicle are internal longitudinal beams of the high-voltage storage unit that can support crash loads. Thus, the force transmitted by interlocking engagement onto the load transmission elements as a result of deformation of the front-axle support is transmitted precisely into the longitudinal beams of the high-voltage storage unit, and the flux of forces passed on there by its attachment to the body structure. The load transmission elements consequently prevent further backward displacement of the front-axle support in the direction of the high-voltage storage unit, by support on the longitudinal beam, and in this way also prevent an intrusion of the structure into the battery cells of the high-voltage storage unit.

This is advantageously achieved particularly effectively and in a structurally simple way if the front-axle support consists at least of two front-axle longitudinal beams, one of which in each case, respectively assigned to a side of the vehicle, is attached to the crossbeam component by way of two fastening points, at least one fastening point in each case lying opposite a front supporting region of a load transmission element in the longitudinal direction of the vehicle. It is particularly simple and effective for fitting that, for example, for this purpose each load transmission element may be fastened, in particular by means of a joining connection, in particular by welding or else by means of a bolted or riveted connection, on the floor element of the storage housing, extending in the longitudinal direction of the motor vehicle, placed with play in relation to the axle support or in relation to an axle support fastening and directed rearward onto a longitudinal beam integrated in the high-voltage storage unit.

The invention is now presented on the basis of a preferred exemplary embodiment with reference to the drawings.

BRIEF DESCRIPTION THE DRAWINGS

Figure 2:
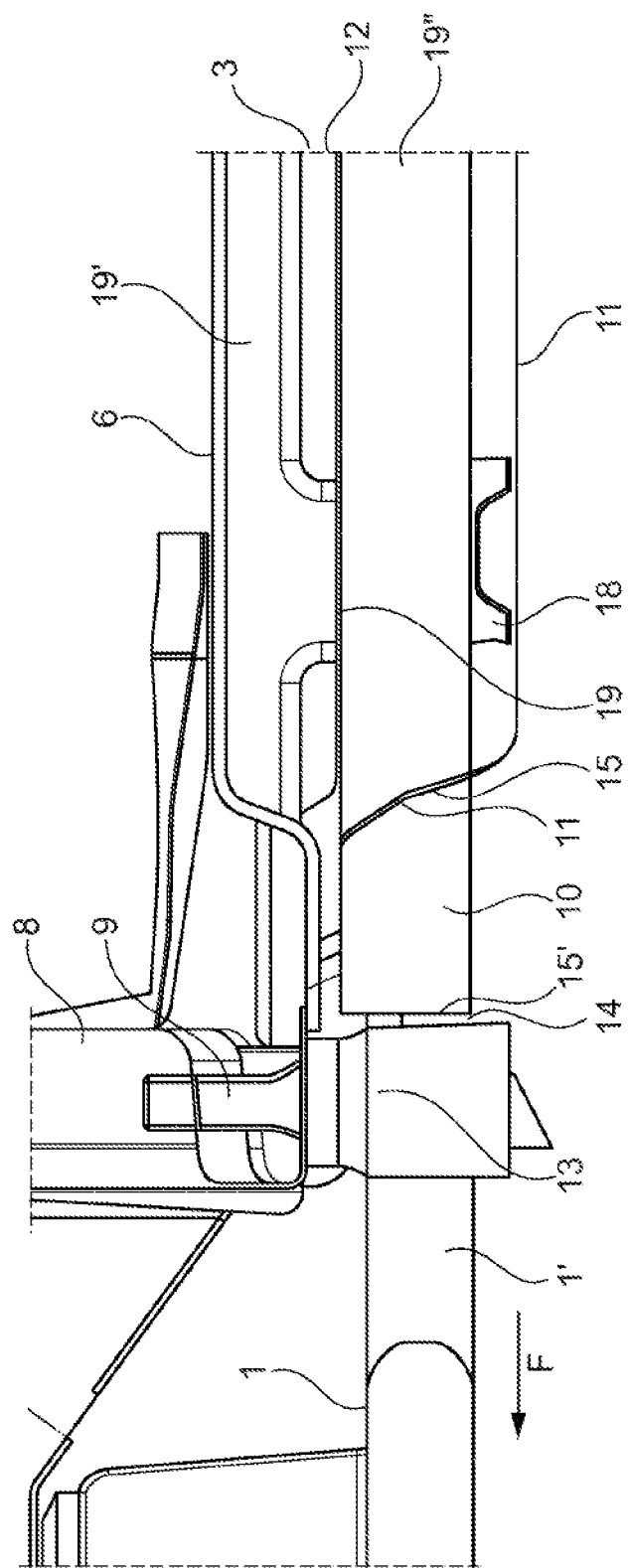

FIG. 1 is a perspective view of a motor-vehicle partial front structure according to an embodiment of the invention, directed from below onto the axle support and floor element of an energy storage floor assembly; and FIG. 2 is a partial longitudinal sectional representation from FIG. 1, along the sectional line A-A, on a larger scale, of the rear region, seen in the traveling direction, of the axle support and of the front region of the energy storage floor assembly.

DETAILED DESCRIPTION THE DRAWINGS

In a plan view, from below onto a front-axle support 1 of a motor vehicle, FIG. 1 shows, as seen in the traveling direction F of the motor vehicle, enclosed by a body structure 2 and installed therein, an energy storage floor assembly 3 for the electrically driven motor vehicle. Of the body structure 2, here there can be seen a front end wall 4 of a passenger cell, which is adjoined in the forward direction by a front-end structure 5 and is continued in the downward direction by a crossbeam component 8. The front-end structure 5 comprises for example a front longitudinal beam, or engine support 5', of a middle longitudinal beam level. In the rearward direction, the end wall 4 merges via the crossbeam component 8, as can be seen in FIG. 2, into a vehicle floor 6, which downwardly delimits a passenger cell and to the side reaches as far as side sills 7 (FIG. 1), which run in the longitudinal direction of the vehicle.

Under the vehicle floor 6, a floor element 11 forms together with the latter a cavity which contains housing parts of a multipart storage housing 12 and serves for receiving battery modules (not depicted) of an electrical energy storage device. As can be seen in FIG. 2, the vehicle floor 6 and the floor element 11 are connected to one another, it being possible for a gas-tight connection (not depicted) that runs around the outer periphery to be provided.

The storage housing 12 is therefore formed under the vehicle floor 6, together with the latter as an upper wall and closed from below by the floor element 11.

For stiffening and fastening the battery modules, longitudinal beams 19 and transverse beams 18 running parallel to one another are installed in the storage housing 12, each longitudinal beam 19 consisting of two longitudinal beam parts 19', 19", which run over one another, can be connected to one another and can be released from one another, with a bolted connection with respect to the floor element 11, an upper longitudinal beam part 19', connected to the vehicle floor 6, and a lower longitudinal beam part 19", connected to the floor element 11. The lower longitudinal beam part 19" runs between the cell modules and, forward in the traveling direction, reaches as far as the end face of the storage housing 12, up to the floor element 11.

Outside the floor element 11, a load transmission element 10 is welded on it in such a way that the latter continues the lower longitudinal beam part 19" forward in the longitudinal direction of the vehicle, outside the floor pan 11, and is therefore supported with a rear supporting region 15 on the floor pan 11 while being at least congruent with the lower longitudinal beam part 19", and consequently in the event of a crash a flux of force is produced from the front-axle support 1 via the load transmission element 10 and the floor pan 11 into the lower longitudinal beam part 19" when load is applied to a front supporting region 15' of the load transmission element 10 as a result of a displacement or deformation of the front-axle support 1.

The straight connection in the forward direction, of the lower longitudinal beam parts 19" by way of the floor pan 11 and the supporting regions 15, 15' of the load transmission element 10, to an axle-support screw-connection bush 13, with which the rear region of the front-axle support 1 is attached to the crossbeam component 8 by way of an axle-support bolt 9, has a gap 14 with a gap width of 5 millimeters between the front supporting region 15' of the load transmission element 10 and the axle-support screw-connection bush 13, on the one hand to allow separate fitting of the front-axle support 1 and the storage housing 12 and on the other hand to give the front-axle support a specific free deformation region in the event of a frontal crash, without other components that follow, counter to the traveling direction F, that is to say in the rearward direction, in the floor region being immediately affected. On the other hand, the gap 14 is completely closed by displacing the axle support 1, in that the axle-support screw-connection bush 13 comes to lie against the front supporting region 15' of the load transmission element 10 and the latter absorbs the flux of force from the front-axle support 1 and introduces it via its rear supporting region 15, by means of the wall of the floor pan 11, into the lower longitudinal beam part 19", from where the flux of force is introduced via the upper longitudinal beam part 19' into the vehicle floor 6 and into the body.

In FIG. 1, two load transmission elements 10 are used, since the front-axle support 1 consists of two longitudinal beams 1', 1", one of which in each case, respectively assigned to a side of the vehicle, is attached by way of two fastening points with axle-support screw-connection bushes 13 to the crossbeam component 8. One fastening point thereof in each case, the one on the inside of the vehicle, lies opposite a front supporting region 15' of a load transmission element 10 in the longitudinal direction of the vehicle.

The invention claimed is:

1. An energy storage floor assembly for a motor vehicle with an electric drive, comprising:
   a storage housing in which an electrical energy storage device is accommodatable, the storage housing being arranged on an underside of a vehicle floor,
   wherein the storage housing contains at least one longitudinal beam, a front end of which, viewed in a longitudinal direction of the vehicle, is at least indirectly connected to a crossbeam component, which is arranged in a region of a front-end structure and to which a front-axle support is attached; and
   at least one load transmission element inserted between a rear region of the front-axle support and the front end of the at least one longitudinal beam, which the at least one load transmission element has at a front end a front supporting region and at a rear end a rear supporting region,
   wherein, in an event of an accident-induced backward movement of the front-axle support as a result of a collision, the front-axle support is able to be supported on the front supporting region of the at least one load transmission element, and the rear supporting region of the at least one load transmission element is able to be at least indirectly supported on the at least one longitudinal beam,
   wherein the front-axle support comprises two front-axle longitudinal beams, one of which in each case, respectively assigned to a side of the vehicle, is attached to the crossbeam component by way of two fastening points, one fastening point in each case lying opposite the front supporting region of a respective load transmission element in the longitudinal direction of the vehicle.

2. The energy storage floor assembly according to claim 1, wherein
   a gap is provided between the front supporting region of each load transmission element and the front-axle support or a front-axle support fastening, in the longitudinal direction of the vehicle.

3. The energy storage floor assembly according to claim 2, wherein
the gap has a distance of 5 to 10 millimeters.

4. The energy storage floor assembly according to claim 1, wherein
each load transmission element is attached to a floor element of the storage housing by a joining connection.

* * * * *